Aug. 16, 1927.
O. V. GREENE
1,639,133
FILTER ELEMENT
Filed Jan. 25, 1926
2 Sheets-Sheet 1
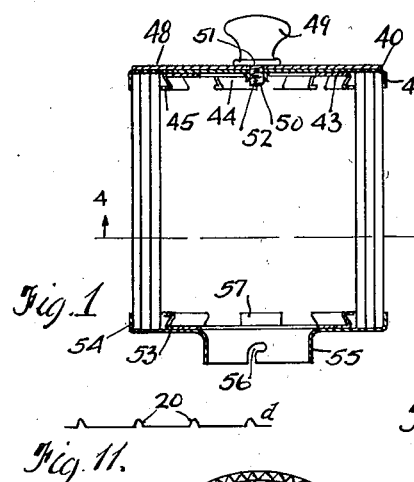
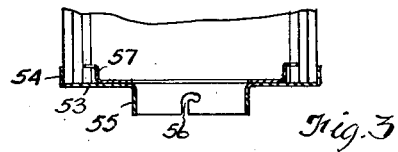
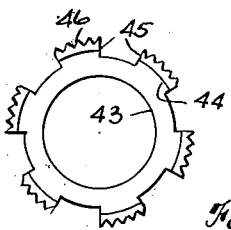
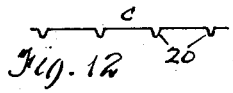
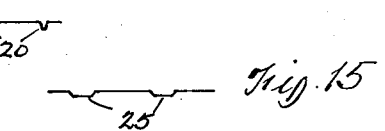
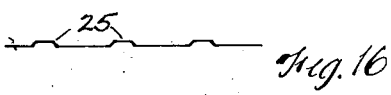
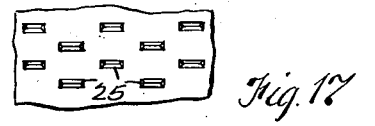
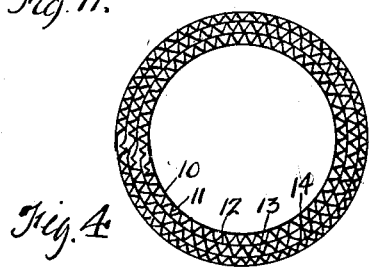
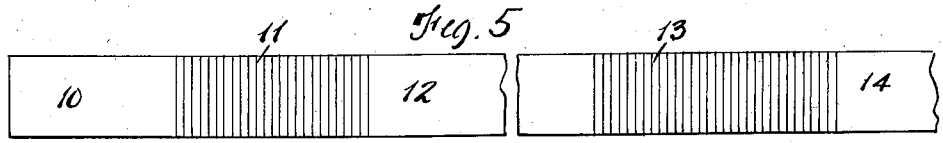
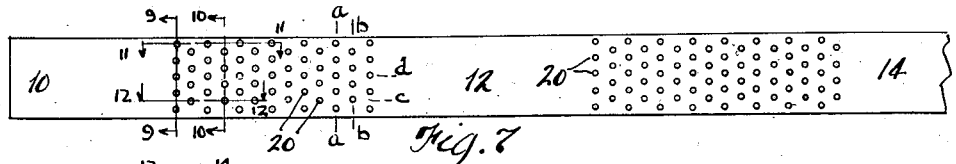
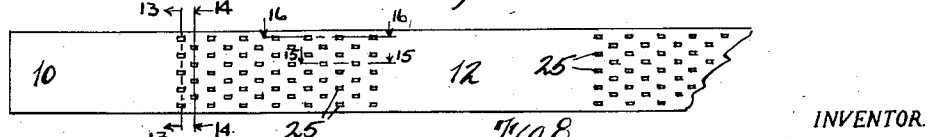
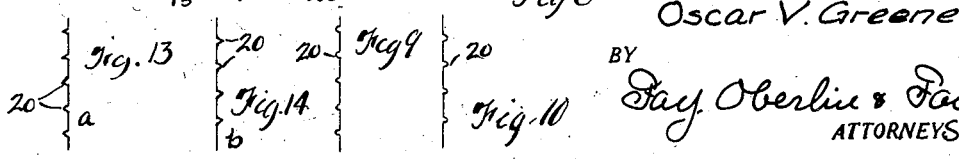
INVENTOR.
Oscar V. Greene.
BY
Fay, Oberlin & Fay
ATTORNEYS.

Aug. 16, 1927.  
O. V. GREENE  
1,639,133  
FILTER ELEMENT  
Filed Jan. 25, 1926  
2 Sheets-Sheet 2
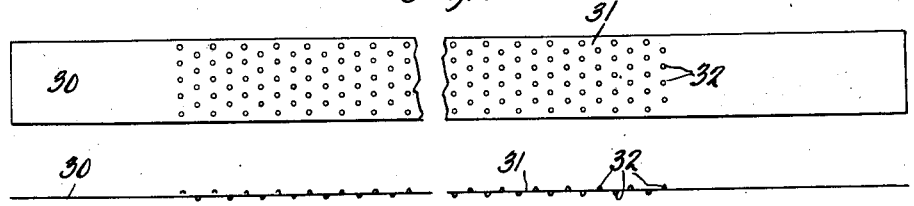
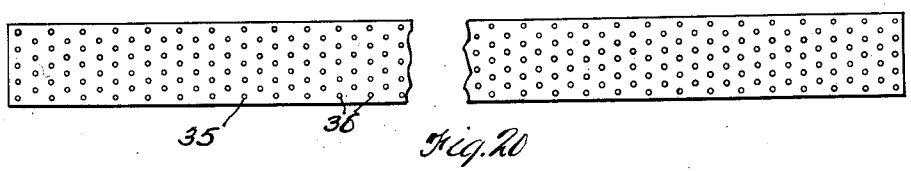
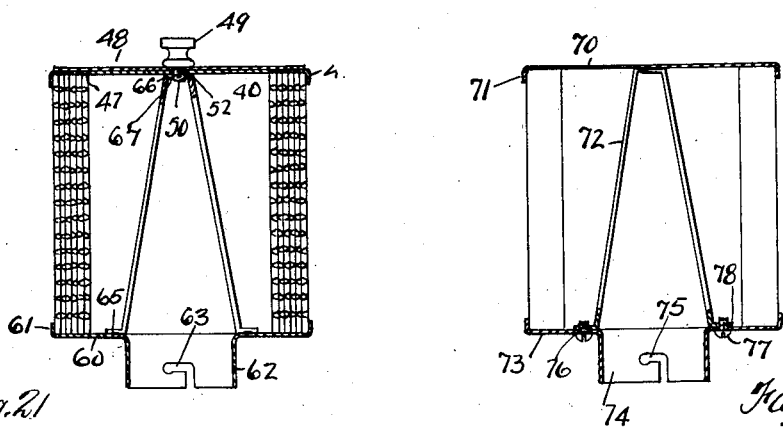
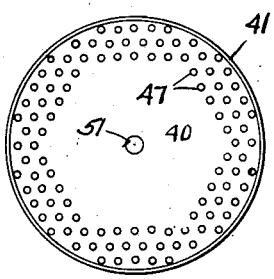
INVENTOR.  
Oscar V. Greene  
BY  
Fay, Oberlin & Fay  
ATTORNEYS.

Patented Aug. 16, 1927.

1,639,133

UNITED STATES PATENT OFFICE.

OSCAR V. GREENE, OF CLEVELAND, OHIO.

FILTER ELEMENT.

Application filed January 25, 1926. Serial No. 83,448.

The present invention relates to filter elements for filtering air and gas and more particularly to the construction of a cylindrical element for use as an air filter for internal combustion engines, air compressors and the like. The present filter is similar in general construction and arrangement of the filtering sheets to that shown in my co-pending application, Ser. No. 20,400 but more particularly the present construction provides a filter having spaced sheets rolled up from a single strip of material and also provides new top and bottom constructions which can be easily attached to the element. The object is to provide a filter construction, satisfactory from its efficiency, and which is suitable for production in large quantities at low cost. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a vertical sectional view through a filter showing one form of mounting construction; Fig. 2 is a plan view of one of the holding members shown in Fig. 1; Fig. 3 is a fragmentary sectional view through a filter shown in Fig. 1 but showing the holding member in its expanded position; Fig. 4 is a transverse section on the line 4—4 of Fig. 1; Fig. 5 is a plan view of a sheet of material from which the element is rolled; Fig. 6 is an edge elevation of the sheet shown in Fig. 5; Figs. 7 and 8 are plan views similar to Fig. 5, showing modified forms; Figs. 9, 10, 11 and 12 are sectional views taken on the lines 9—9, 10—10, 11—11 and 12—12 respectively of Fig. 7; Figs. 13, 14, 15 and 16 are sectional views taken on the lines 13—13, 14—14, 15—15 and 16—16 respectively of Fig. 8; Fig. 17 is an enlarged plan view of a portion of the sheet shown in Fig. 8; Fig. 18 is a plan view of another form of sheet; Fig. 19 is an edge elevation of the sheet shown in Fig. 17; Fig. 20 is a plan view of a sheet showing another modification; Figs. 21 and 22 are vertical sectional views through two modified forms of filters showing different top and bottom constructions; and Fig. 23 is a plan view of the apertured plate shown as the top plate of Fig. 20.

The present invention relates to air filters of the cylindrical type, the filter element consisting of a series of spaced sheets of filtering material such as screen cloth, rolled into a cylinder with a cover at one end and having an outlet pipe to which the element is secured at the other end. In the previous forms as described in my previously mentioned co-pending application, the device consists of a flat sheet or sheets and a corrugated sheet rolled up together to form a cylinder of spaced sheets.

In the present construction as best shown in Figs. 5 to 8 inclusive and in Figs. 18, 19 and 20, instead of using a sheet of corrugated material and also a separate sheet of flat material, the element is rolled up out of a single sheet of material such as woven wire screen cloth, this sheet being provided with corrugations or indentations or projections extending from both sides of the sheet, which projections take the place of the corrugated sheet of the previous form and allow the device to be rolled into a cylinder having a series of spaced sheets of filtering material but which do away with the necessity of using two sheets which must be secured together before they are rolled.

In the form shown in Fig. 5, the single sheet of material is provided with a flat or uncorrugated portion 10 at one end and then has a corrugated section 11 followed by another flat section 12 and another corrugated portion 13 and then with a third flat or uncorrugated portion 14. Each of these portions is of sufficient length to make one complete lap or layer in the finished cylindrical element and enough sections will be provided to give the required number of layers or laps in the finished element. When rolled up, the first uncorrugated section 10 is rolled about a form of such a size as to allow this section to make one complete lap around the cylindrical form with a slight overlap so as to form a smooth inner surface to the filtering element. As the sheet is rolled further, the corrugated section 11 is rolled into the cylinder and this makes one complete lap over the section 10. Further rolling brings the uncorrugated section 12 as a lap around the element and then the next corrugated section 13 and the flat section 14. The rolling of the sheet is continued until all of the sections are formed into a cylinder and preferably, as best shown in Fig. 4, the finished cylindrical element consists of at least four uncorrugated sections and three corrugated or spacing sections.

In Figs. 7, 9, 10, 11 and 12, a modified form of sheet is illustrated, this sheet showing the same series of flat sections 10, 12 and 14 with spacer sections 11, 13, etc., therebetween but in this form instead of corrugating the spacer sections, they are formed by embossing or pressing projections 20 extending outwardly from both sides of the sheet. These projections as illustrated in Figs. 9 and 10 are conical in shape with rounded or flattened end portions and the projections of one row $a$ transversely of the sheet extend to one side of the same while the projections in the next row $b$ extend to the other side of the sheet. The projections of adjacent rows may be staggered transversely of the sheet so that the projections in each row $c$ longitudinally of the sheet all extend to the same side of the sheet as is best illustrated in Figs. 11 and 12.

In the form shown in Figs. 8, 13, 14, 15, 16, and 17, the projections 25 instead of being conical as illustrated in Figs. 7, etc., are in the shape of elongated pyramids as is best shown in the enlarged scale on Fig. 17. The spacing of the projections and their direction to the opposite sides of the sheet are similar in this form to that of the conical projections and this spacing will be clear from Figs. 13, 14, 15 and 16.

In Figs. 18 and 19, a slightly different form of sheet is provided. In this form, the sheet has a flat end portion 30 at the left end which makes the first or interior layer of the element and then the entire intermediate portion 31 of the sheet is provided with projections 32 or spacers whether projections or corrugations and the sheet has only a second flat portion 33 which is at the other end of the sheet and which makes the smooth outside surface of the element. In Fig. 20, the entire sheet 35 is shown as provided with projections or spacers 36 and this sheet can be rolled up into the cylindrical element and while both the interior and exterior surface will of course be rough, this is the simplest form which can be made and is satisfactory for certain uses.

In Figs. 1, 2 and 3, the mounting or top and bottom construction is shown for the cylindrical element, the mounting consisting of a top plate 40 having a downwardly extending flange 41 at its outside edge adapted to receive the cylindrical element and this plate is provided on its inner surface with an expanding member which is a ring 43 having a downwardly and inwardly extending discontinuous flange 44 and an outwardly extending discontinuous rim 45 which is cut or notched to provide a series of teeth 46. This expanding member is preferably spot welded or otherwise securely fixed to the under side of the top plate 40. This top plate is provided as best shown in Fig. 23 with a series of apertures 47 adjacent its periphery, which apertures are so spaced as to cover the depth of the filtering element and thus allow dirt or dust which accumulates on the layers of the element to be removed from between the layers. To close these openings when the element is in use, a flat cover 48 is provided which fits over the top plate and is secured thereto by means of a knob 49 having a threaded stem 50 which passes through an aperture 51 in the cover and is engaged with a screw threaded opening 52 formed in the top plate. The bottom construction consists of a bottom plate 53 having an upwardly extending outer flange 54 and having a downwardly extending connecting flange or pipe 55 provided with bayonet slots 56 for attachment to the air pipe on which the device is to be mounted. An expanding member 57 similar to the top expanding member is attached to the upper surface of this bottom plate as best shown in Fig. 1. After the element has been received between the flange of the top plate and the expanding member, the latter is expanded outwardly so as to force the teeth 46 of the expanding member into the screen of the filtering element and similarly the bottom expanding member 57 is forced into the element until it assumes the form shown in Fig. 3, thus locking the cylindrical element securely in place in the top and bottom members.

In Fig. 21, a modified form of mounting is shown for the cylindrical filtering element, this construction providing a top plate 40 having the same downwardly extending flange 41 to receive the element and the same series of apertures 47 for the cleaning of the same and the same threaded central aperture 52 for receiving the threaded stem 50 of the knob or handle 49 which holds the cover 48 in position. The bottom plate 60 in this form is similar to that of the previous form being provided with the upwardly extending outer flange 61 and the downwardly extending pipe type flange 62 with the bayonet slots 63 but in place of the expanding members of the previous form, this construction provides a yoke 64 which has its feet 65 welded or otherwise secured to the bottom plate and which has a flat top portion 66 provided with a threaded aperture 67 which is engaged by the threaded stem 50 of the knob so as to clamp the top and bottom plates together on the cylindrical element.

In Fig. 22, a further modified form is illustrated in which no provision is made for cleaning the element from between the sheets and in this form the top plate is merely a cover 70 with a down-turned flange 71 which has the yoke member 72 welded or riveted thereto. The bottom member 73 is cup shaped with a downwardly etxending connecting pipe 74 having bayonet slots 75 but this plate is provided with a pair of apertures 76 adapted to receive bolts or rivets 77 which pass through the feet 78 of the yoke to secure the yoke and top plate in position to hold the filtering element between the top and bottom plates. To clean this form, it is necessary to wash the accumulated dust and dirt out through the filtering cylinder but this form may be used where low cost is essential and where it can easily be removed and washed.

The present filter provides but a single sheet of the filtering material which may be rolled about a cylinder to form the completed cylindrical filtering element. The element itself gives a series of spaced filtering sheets as in my previous constructions and of course may be provided with the extra bias pieces to increase the density of the inner layers if desired. The spacing projections which are formed in the sheets themselves may be regularly or irregularly spaced, it being only necessary to have them extend to both sides of the sheet so as to leave the unbent part of the sheet spaced away from the adjacent sheets or layers in the finished cylinder. The projections should preferably have round or flattened ends or edges so as to keep the contacting portions of several sheets or layers as small in area as possible and yet prevent the projections passing through the openings in the adjacent sheets.

The top and bottom constructions shown are so arranged that the raw ends of the screen are always covered and thus the cylinder does not need to be made with either selvage or turned edges as these edges or ends in the finished element are always covered by the top or bottom plates, thus preventing raveling of the screen and contact with the raw ends. The top and bottom plate constructions are simple to make and to assemble and are merely cups which may be pressed from relatively thin sheet material. The present filtering element is thus simplified over my previous constructions both as to the manufacture of the element itself and the manufacture and assembly of the element and the top and bottom members.

Other modes of applying the principle of my invention may be employed instead of the one explained, change being made as regards the mechanism herein disclosed, provided the means stated by any of the following claims or the equivalent of such stated means be employed, I therefore particularly point out and distinctly claim as my invention:

1. A filtering element comprising a strip of foraminous material provided with projections adapted to space apart the layers of said material when rolled to form a hollow cylinder of several revolutions, and means adapted to direct the flow of air through said layers in sequence.

2. A filtering element consisting of a strip of wire screening rolled to form a hollow cylinder of several layers, and means for spacing apart said layers consisting of projections incorporated in the body of said screen, and means adapted to direct the flow of air through said layers in sequence.

3. A filtering element consisting of a strip of woven wire screen rolled into a hollow cylinder of several layers, the strip having end portions of flat screen and a center portion formed with projections adapted to act as spacers when said strip is rolled into its cylindrical form.

4. A filtering element consisting of a strip of woven wire screen rolled into a hollow cylinder of several layers, the strip having end portions of flat screen and a center portion formed with projections adapted to act as spacers when said strip is rolled into its cylindrical form, said end portions being of a length to form a single complete smooth inner and exterior surface of the cylinder.

5. A filtering element consisting of a strip of woven wire screen rolled into a hollow cylinder of several layers, the strip having end portions of flat screen and a center portion formed with projections extending to both sides of the sheet to space each revolution of the sheet from the adjacent revolutions when formed into the cylinder.

6. A filtering element consisting of a strip of woven wire screen rolled into a hollow cylinder of several layers, the strip having end portions of flat screen and a center portion formed with projections extending to both sides of the sheet to space each revolution of the sheet from the adjacent revolutions when formed into the cylinder, said end portions being of just sufficient length to form a complete interior and exterior smooth surface to the cylinder.

7. A filtering element consisting of a sheet of woven wire screen having projections on both sides rolled to form a hollow cylinder of spaced layers of screen.

8. A filtering element consisting of a single sheet of woven wire screen having smooth end portions and an intermediate body portion provided with projections on both sides rolled into a hollow cylinder of spaced layers of screen and providing a smooth interior and exterior surface.

9. A filtering element consisting of a single sheet of woven wire screen having smooth end portions and a body portion divided into a series of smooth portions and portions with projections, rolled into a hollow cylinder, each portion being of a length to form one layer in the finished cylinder, the portions with projections forming spacer layers to prevent smooth portions from lying adjacent each other.

10. In filter construction having a hollow cylindrical filtering element, the combination of a bottom member adapted for engagement with an air pipe and having an upwardly extending flange adapted to receive the cylindrical element, and an expanding member secured to said bottom member and having a toothed edge flange adapted to be expanded into engagement with said element to secure the same between said expanding member and said flanged bottom member, and a cover plate for the other end of said element.

11. In filter construction having a hollow cylindrical filtering element, the combination of a bottom member adapted for engagement with an air pipe and having an upwardly extending flange adapted to receive the cylindrical element, an expanding member secured to said bottom member and having a toothed edge flange adapted to be expanded into engagement with said element to secure the same between said expanding member and said flanged bottom member, a cover plate for the other end of said element, consisting of a plate having a downwardly extending flange adapted to receive said element, and an expanding member secured to said plate and adapted to be expanded into engagement with said element to secure the same between said cover plate flange and said expanding member.

12. In filter construction having a hollow cylindrical filtering element, the combination of a bottom member adapted for engagement with an air pipe and having an upwardly extending flange adapted to receive the cylindrical element, an expanding member secured to said bottom member and having a toothed edge flange adapted to be expanded into engagement with said element to secure the same between said expanding member and said flanged bottom member, a cover plate for the other end of said element, consisting of a plate having a downwardly extending flange adapted to receive said element, an expanding member secured to said plate and adapted to be expanded into engagement with said element to secure the same between said cover plate flange and said expanding member, said plate having apertures over the body of said element for the removal of dirt from between the element, and a cover removably secured to said cover plate and closing said apertures.

13. In filter construction having a hollow cylindrical filtering element, the combination of a bottom member adapted for removable engagement with an air pipe, a yoke member secured to said bottom member and extending up through the hollow center of the element, and adapted to contact with and seal the end thereof; a top cover member fitting over said element, and means for fixedly securing said cover member to said yoke to seal the bottom of said element against said bottom member.

14. In filter construction having a hollow cylindrical filtering element, the combination of a bottom member adapted for engagement with an air pipe and having an upwardly extending flange adapted to receive the cylindrical element, a yoke member secured to said bottom member and extending up through the hollow center of the element, a cover plate having a downwardly extending flange for the top of said element, said plate having apertures opposite the element for the removal of dirt and being secured to said yoke member, and a removable cover for said plate to close such apertures.

15. In filter construction having a hollow cylindrical filtering element, the combination of a bottom member adapted for engagement with an air pipe and having an upwardly extending flange adapted to receive the cylindrical element, a cover for said element comprising a plate having a downwardly extending flange adapted to fit around the element and to contact with and seal the top of said element, said plate having a yoke member fixedly secured thereto, and means for removably securing the feet of said yoke member to said bottom member to seal the bottom of said element thereupon.

16. In filter construction having a hollow cylindrical filtering element, the combination of a bottom and a top member fixedly secured to said element and adapted to cover the ends thereof; one of said members having a large central opening, and one member having a plurality of peripheral openings corresponding to the end section of said element; means adapted to connect said large central opening to an air pipe; and means adapted to cover said peripheral openings when said filter is in operating position, and to uncover said peripheral openings for the removal of dirt collected by said element through said openings.

Signed by me this 21" day of January, 1926.

OSCAR V. GREENE.